United States Patent
Golik et al.

(10) Patent No.: US 10,154,179 B2
(45) Date of Patent: Dec. 11, 2018

(54) SYSTEM, METHOD, AND APPARATUS FOR DISCRETELY RECORDING AN EVENT FROM THE PERSPECTIVE OF AN EVENT PARTICIPANT

(71) Applicants: Donna Marie Golik, Miami, FL (US); Lauren Marie Golik, Miami, FL (US)

(72) Inventors: Donna Marie Golik, Miami, FL (US); Lauren Marie Golik, Miami, FL (US)

(73) Assignee: BoCam LLC, Miami, FL (US)

( * ) Notice: Subject to any disclaimer, the term of this patent is extended or adjusted under 35 U.S.C. 154(b) by 138 days.

(21) Appl. No.: 15/362,999

(22) Filed: Nov. 29, 2016

(65) Prior Publication Data
US 2017/0171435 A1    Jun. 15, 2017

Related U.S. Application Data

(60) Provisional application No. 62/267,080, filed on Dec. 14, 2015.

(51) Int. Cl.
*H04N 5/225* (2006.01)
*G03B 17/02* (2006.01)

(52) U.S. Cl.
CPC ........... *H04N 5/2252* (2013.01); *G03B 17/02* (2013.01)

(58) Field of Classification Search
CPC .............................. H04N 5/2252; G03B 17/02
USPC .......................................................... 348/151
See application file for complete search history.

(56) References Cited

U.S. PATENT DOCUMENTS

| 2005/0259836 | A1* | 11/2005 | Yeh ........................ G09B 5/065 381/124 |
| 2012/0262455 | A1 | 10/2012 | Friedland |
| 2014/0218519 | A1 | 8/2014 | Borovinov |

* cited by examiner

*Primary Examiner* — Nam D Pham
(74) *Attorney, Agent, or Firm* — Dunlap Bennett & Ludwig PLLC; Brendan E. Squire

(57) ABSTRACT

An ornamental designed housing to attach a video recording device on or in flower bouquets. The invention improves and compliments the floral bouquet. The housing has a plurality of slots to thread either a ribbon or a stick for attachment to the bouquet. It also has areas that allow for optimum sound recording and ease of use during a ceremony.

20 Claims, 3 Drawing Sheets

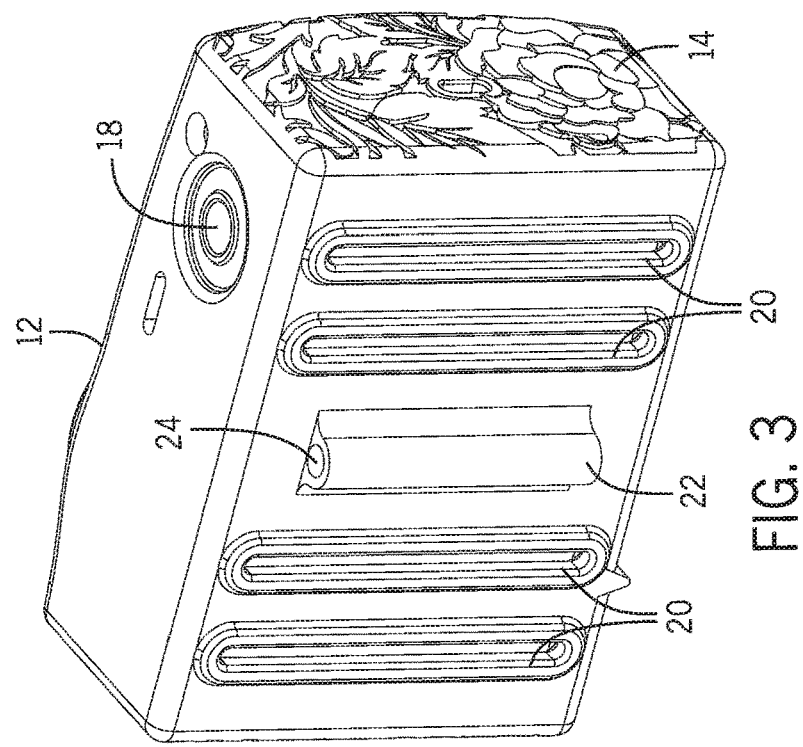
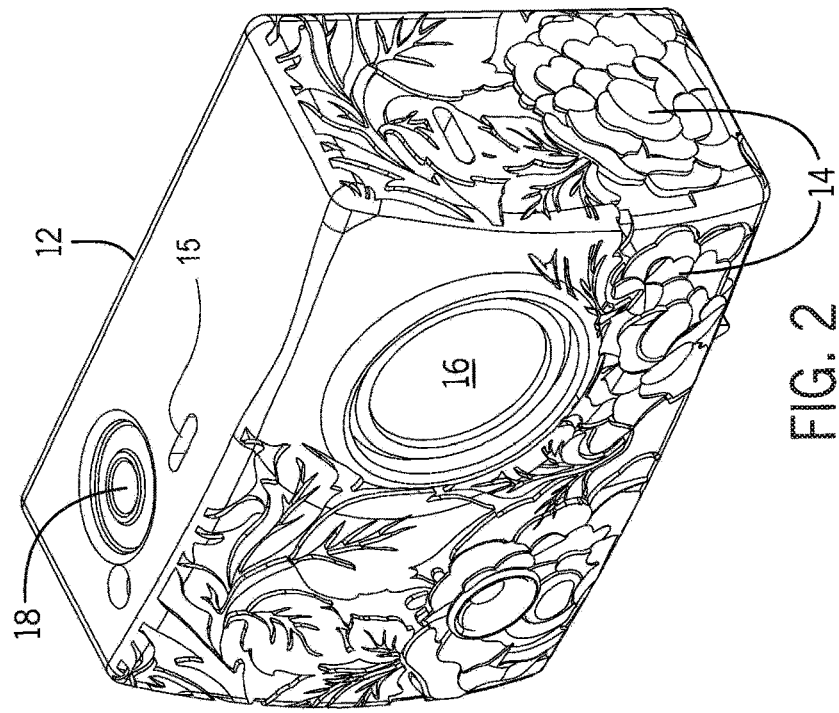

SYSTEM, METHOD, AND APPARATUS FOR DISCRETELY RECORDING AN EVENT FROM THE PERSPECTIVE OF AN EVENT PARTICIPANT

CROSS-REFERENCE TO RELATED APPLICATION

This application claims the benefit of priority of U.S. provisional application No. 62/267,080, filed Dec. 14, 2015, the contents of which are herein incorporated by reference.

BACKGROUND OF THE INVENTION

The present invention relates to video recording devices and, more particularly, to video recording devices for capturing an event from the perspective of a primary participant at an event.

Currently in the art, there isn't a way to discreetly attach a video recording device to a flower bouquet in order to record and capture a special event from the unique perspective of the person carrying the bouquet. The main problem with other camera housing devices is their appearance and functionality. These other devices are made for athletic and water sports, and are bulky and cumbersome in order to provide durability. Most other camera housing devices also sacrifice sound quality in order to provide the desired durability for athletic and water sports activities.

As can be seen, there is a need for an improved video recording device that may be discretely and conveniently carried with and one that compliments a floral bouquet. It also has specifically designed slots to thread either the ribbon or stick for attachment to the bouquet. It also has areas that allow for optimum sound recording and ease of use during a ceremony.

SUMMARY OF THE INVENTION

In one aspect of the present invention, an apparatus for discretely recording an event from the perspective of an event participant, includes a housing configured to substantially enclose a body of a camera; a lens opening defined in a face of the housing; and an attachment means for securing the housing to an object carried by the event participant. In a preferred embodiment of the invention, the object carried by the event participant is a floral bouquet. In some instances a ribbon is operatively coupled to the housing and adapted to be secured around the floral bouquet. The housing may also have a plurality of vertical slots defined in a spaced apart relation on a back surface of the housing. The ribbon may be threadingly received through the plurality of vertical slots.

In other embodiments, the attachment means may include a boss protruding from a back surface of the housing, an aperture extending into the boss, and a rod received in the aperture. Preferably, the rod is carried with the bouquet. In yet other embodiments, the attachment means is a clip operatively coupled to a back surface of the housing. The clip may be received in at least one vertical slot defined in the back surface of the housing.

Preferably, the housing carries a floral surface ornamentation. The surface ornamentation may be printed on a surface of the housing. Alternatively, the surface ornamentation is a three dimensional molding of a surface of the housing.

Yet other aspects of the invention include an apparatus for discretely recording an event from the perspective of an event participant, having a housing configured to substantially enclose a body of a camera, a lens opening defined in a face of the housing, a control opening defined in a face of the housing; and an attachment means for securing the housing to a floral bouquet carried by the event participant. The attachment means may be a plurality of spaced apart vertical slots defined in a back surface of the housing. It may also include a ribbon threadingly received through the plurality of spaced apart vertical slots. Additional attachment means may include: a boss protruding from the back surface of the housing, an aperture formed through at least a portion of the boss; and a rod configured to be received in the boss aperture. In an alternative embodiment, the attachment means may be a clip operatively attached to at least one of the plurality of spaced apart vertical slots.

The invention also includes a method for discretely recording an event. The method includes providing a housing configured to substantially enclose a body of a camera, the housing having a lens opening defined in a face of the housing, a control opening defined in a face of the housing; and an attachment means for securing the housing to an object with the camera lens oriented for capturing a desired a point of view selected by an event participant. The object may be a floral bouquet. The floral bouquet may be carried by the event participant.

These and other features, aspects and advantages of the present invention will become better understood with reference to the following drawings, description and claims.

BRIEF DESCRIPTION OF THE DRAWINGS

FIG. 2 is a front perspective view of a camera housing.
FIG. 3 is a rear perspective view of the camera housing.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an ornamental housing for a video camera that may be coupled to a floral bouquet, or other object traditionally carried by an event participant, to allow discrete videography of an event from the perspective of the event participant.

Figure 1:
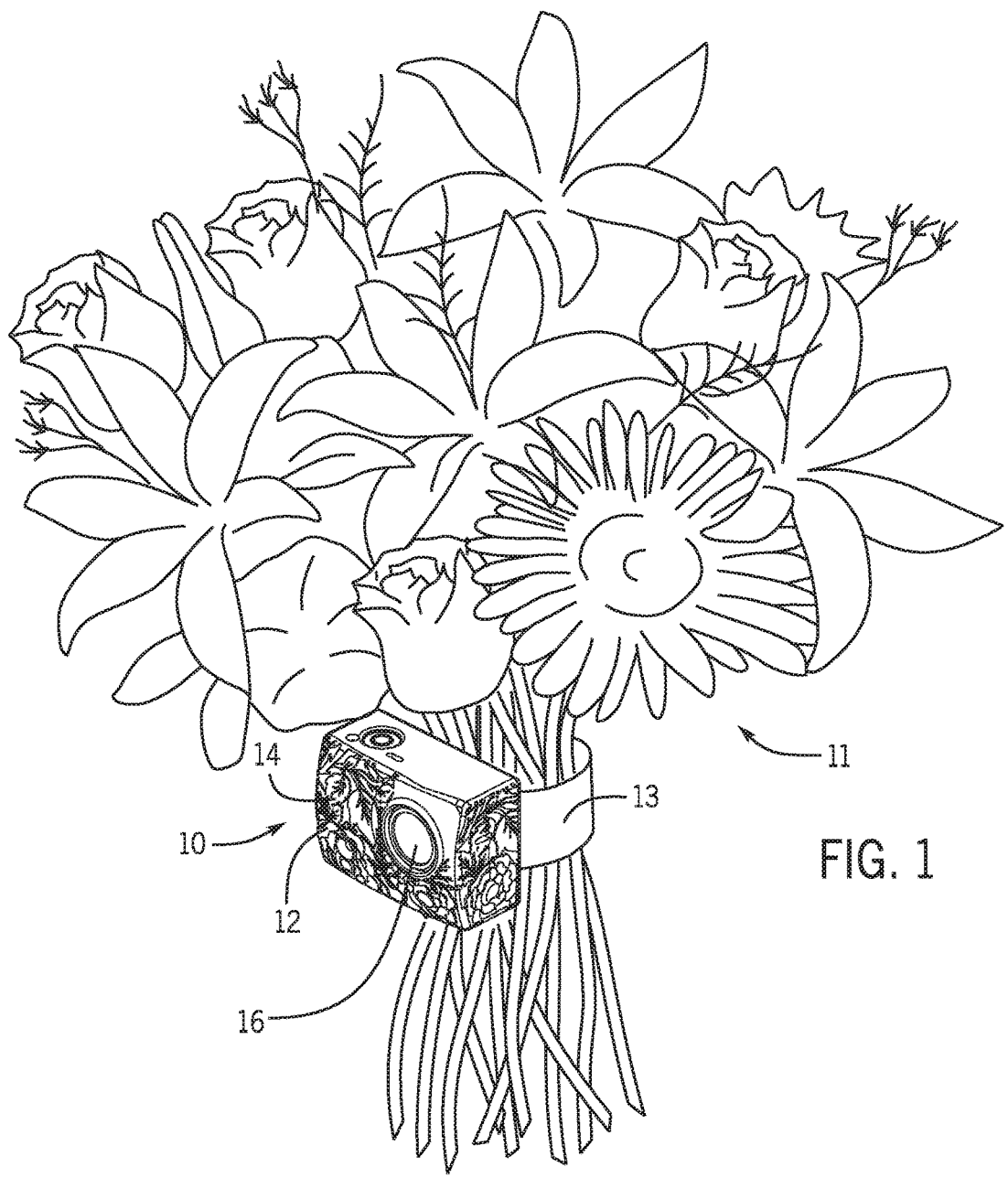
FIG. 1 is a perspective view of the invention in use with a floral bouquet.

As seen in reference to FIG. 1, an ornamental attachment system 10 for a video camera used in conjunction with a floral bouquet 11 is shown applied to the floral bouquet 11. The ornamental attachment system 10 includes a housing 12 to substantially enclose a video camera. The housing 12 may be configured with a floral or other ornamentation pattern 14 that is appropriate for the event. The housing 12 will be configured with a lens opening 16 that surrounds a lens of the camera. The housing 12 is provided with an attachment means that may be operatively coupled to a ribbon 13 for attachment of the camera and housing 10 to the floral bouquet 11.

As seen in reference to FIGS. 2 and 3, the housing 12 may further include a camera control aperture 18 that provides access to the operational controls of the camera carried within the housing 12. The operational controls will at least include a start stop control to initiate or terminate the recording functions of the camera. The ornamentation pattern 14 may be defined at least on a front and side surfaces of the housing 12. The ornamentation pattern 14 may be printed or may be a three dimensional molding of the housing surface 12. An audio aperture 15 is provided in the housing 12 so as to provide unobstructed access to a microphone input to the video camera.

Figure 4:
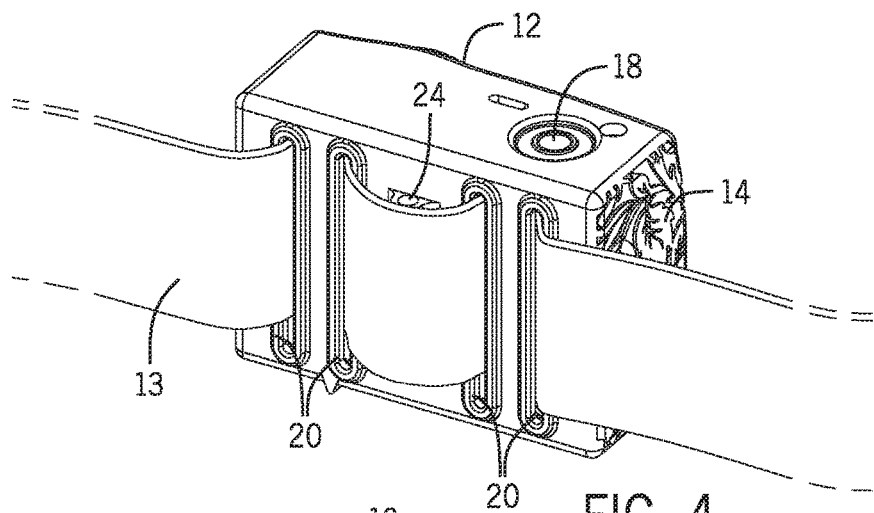
FIG. 4 is a rear perspective view of the camera housing in use.
Figure 5:
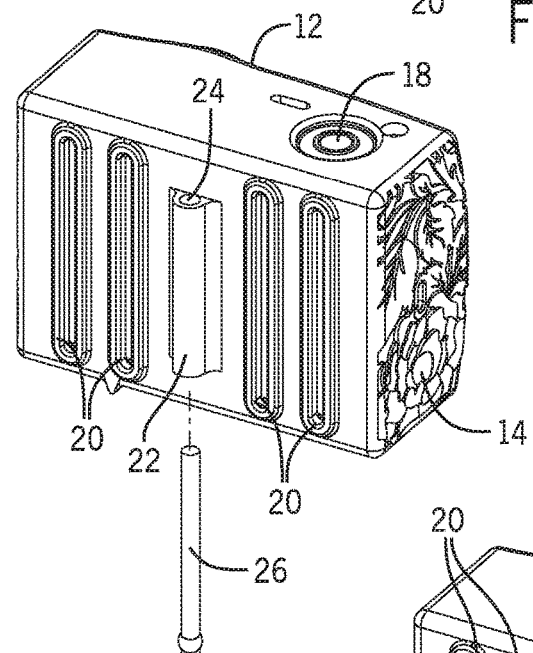
FIG. 5 is an exploded rear perspective view of a second means of attaching the housing.
Figure 6:
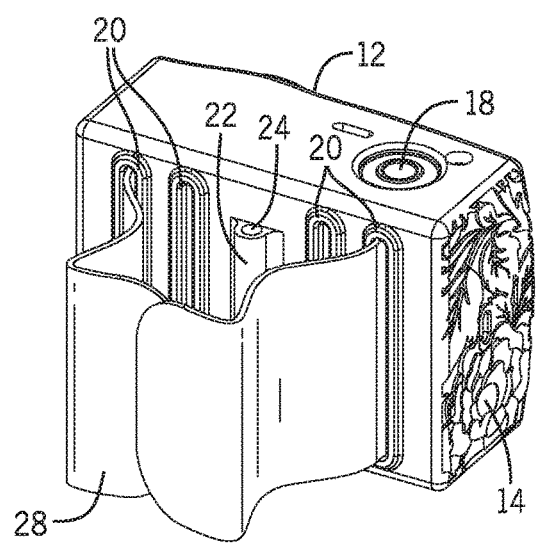
FIG. 6 is a rear perspective view of a third means of attaching the housing.

As seen in reference to FIGS. 4-6, the housing 12 provides for a plurality of attachment means to couple the housing 12 to the floral bouquet 11. By way of non-limiting example, as shown in FIG. 4, the housing 12 may further include a plurality of slots 20 defined in a spaced apart relation across a back surface of the housing 12. The slots 20 are configured to threadingly receive the ribbon 13 so that the housing 12 and camera carried therein may be secured to the bouquet 11 by the ribbon 13. Preferably, the slots 20 extend substantially between a top end of the housing 12 to a bottom end of the housing 12 so as to prevent unnecessary vibration of the camera along a horizontal axis.

As seen in reference to FIG. 5, the housing 12 may also be configured with a boss 22 protruding from a back surface of the housing 12. The boss 22 may have an aperture 24 extending through at least a portion of the boss 22. A stem like rod 26 is adapted to be received in the aperture 24. The rod 26 may be bound along with the stems of the flowers in the floral bouquet 11 such that the housing 12 may be stabilized while the bouquet 11 is carried by the user.

An alternative attachment means may also include a clip 28, which may be secured in one or more of the slots 20. Alternatively, the clip 28 may be configured for attachment to the aperture 24. In the embodiment shown in FIG. 6, the clip 28 is shown attached to the two outer slots 20 of the camera housing 12 of the present invention.

As will be appreciated, the camera housing 12 of the present invention is specifically designed to be discreet, with an elegant aesthetic character, so as to be attached inconspicuously on or in a flower bouquet 11. The housing 12 is made to compliment the look and design of the flower bouquet 11 and to be used in conjunction with a special event where a floral bouquet 11 may be carried, such as a wedding, a prom, or other event. The device 10 is designed to protect and hold the recording device securely, while allowing the best possible video and sound quality.

As contemplated by the present invention, a camera housing 12 to attach on or in a flower bouquet 11 for the purpose of capturing video from a unique perspective, does not currently exist. The present invention is designed to be elegant, discreet, and to complement the aesthetic of a flower bouquet 11, while other camera housing devices are designed for extreme sports and durability.

The present invention can discreetly provide a priceless video recording and memory of a special event from the unique perspective of the special guest holding our invention, before, during and after a special ceremony. It gives the unique 'first-person' perspective of a special event, such as a wedding. It also is a very affordable way to elegantly and discreetly record the memory, and could replace the need for a costly videographer.

The housing 12 may be formed of a Silicone material such that it slips over, protects, and discretely covers the video recording device that is used to record a ceremony or event. The sleek design of the housing 12 elegantly blends into the bouquet 11, and allows for the best possible sound quality and easy control of the recording device's functionalities. The housing 12 may be formed in a number of colors so that the housing 12 coordinates with a selected color scheme for the event or a dress that may be worn by the user.

As will be appreciated, there are many possible variations on these two pieces that could work to perform the same function. The attachment means may include, but are not limited to the following: a pocket, an elastic or flexible securing band, a brace, or a clamp. Additional ways to secure the camera housing 12 to the bouquet 11 may include a watch style band, a Velcro wrap, an elastic, a clip, or a cone. A rigid platform could be attached to the camera to potentially provide structure. A decorative fabric overlay or appliqué could be an added option to be placed over the camera housing 12 to further conceal the video recording device and enhance the overall aesthetic of the bouquet 11.

Rather than threading a ribbon 13 through the camera housing 12 or with a stick 26, the bouquet attachment could be adhered directly to the housing device 12, or the device with an attachment could potentially be molded all out of one piece.

The user would use the present invention to capture a special memory from their own personal perspective of the ceremony. They would first insert the video recording device into the camera housing frame 12. The user would then secure the camera on or in the flower bouquet 11 by inserting the camera into the housing device 12 and wrapping the ribbon 13 to secure it on the base of the bouquet 11; or alternatively by placing the stick stem attachment 26 into the designated holder 24 and placing the camera on the stick 26 inside with the flowers in the bouquet 11.

When ready to record, the user would turn on the recording device and press the "record" button to start recording video, making sure to hold the bouquet 11, using the guide notch, so the recording device is correctly facing forward. Additionally, this invention could also wrap around a vase or other cylindrical object to capture stationary video footage, before during or after a ceremony. The present invention can discreetly produce a priceless video recording and memory of a special event from the unique perspective of the special guest holding our invention, before, during and after a special ceremony. It gives the unique 'first-person' perspective of a special event, such as a wedding. It also is a very affordable way to elegantly and discretely record the memory, and could replace the need for a costly videographer or a team of videographers.

It should be understood, of course, that the foregoing relates to exemplary embodiments of the invention and that modifications may be made without departing from the spirit and scope of the invention as set forth in the following claims.

What is claimed is:

1. An apparatus for discretely recording an event from the perspective of an event participant, comprising:
   a housing configured to substantially enclose a body a camera;
   a lens opening defined in face of the housing, wherein the camera lens is oriented for capturing a desired point of view selected by the event participant; and
   an attachment means for securing the housing to an object carried by the event participant.

2. The apparatus of claim 1, wherein the object carried by the event participant is a floral bouquet.

3. The apparatus of claim 2, wherein the attachment means comprises:
   a ribbon operatively coupled to the housing and secured around the floral bouquet.

4. The apparatus of claim 3, further comprising:
   a plurality of vertical slots defined in a spaced apart relation on a back surface of the housing.

5. The apparatus of claim 4, wherein the ribbon is threadingly received through the plurality of vertical slots.

6. The apparatus of claim 5, wherein the ribbon is secured around the floral bouquet.

7. The apparatus of claim 2, wherein the attachment means comprises:
   a boss protruding from a back surface of the housing;
   an aperture extending into the boss; and
   a rod received in the aperture.

8. The apparatus of claim 7, wherein the rod is carried with the bouquet.

9. The apparatus of claim 2, wherein the attachment means comprises:
   a clip operatively coupled to a back surface of the housing.

10. The apparatus of claim 9, wherein the clip is received in at least one vertical slot defined in the back surface of the housing.

11. The apparatus of claim 2, wherein the housing carries a floral surface ornamentation.

12. The apparatus of claim 11, wherein the surface ornamentation is printed on a surface of the housing.

13. The apparatus of claim 11, wherein the surface ornamentation is a three dimensional molding of a surface of the housing.

14. An apparatus for discretely recording an event from the perspective of an event participant, comprising:
   a housing configured to substantially enclose a body of a camera;
   a lens opening defined in a face of the housing, wherein the camera lens is oriented for capturing a desired point of view selected by the event participant;
   a control opening defined in a face of the housing; and
   an attachment means for securing the housing to a floral bouquet carried by the event participant.

15. The apparatus of claim 14, wherein the attachment means comprises:
   a plurality of spaced apart vertical slots defined in a back surface of the housing.

16. The apparatus of claim 15, further comprising:
   a ribbon threadingly received through the plurality of spaced apart vertical slots.

17. The apparatus of claim 15, wherein the attachment means further comprises:
   a boss protruding from the back surface of the housing;
   an aperture formed through at least a portion of the boss; and
   a rod configured to be received in the boss aperture.

18. The apparatus of claim 15, wherein the attachment means further comprises:
   a clip operatively attached to at least one of the plurality of spaced apart vertical slots.

19. A method for discretely recording an event, comprising:
   providing a housing configured to substantially enclose a body of a camera, the housing having a lens opening defined in a face of the housing, a control opening defined in a face of the housing; and an attachment means for securing the housing to an object with the camera lens oriented for capturing a desired a point of view selected by an event participant.

20. The method of claim 19, wherein the object is a floral bouquet.

* * * * *